Aug. 2, 1960     T. H. SACKETT ET AL     2,947,363
FILL-UP VALVE FOR WELL STRINGS
Filed Nov. 21, 1955
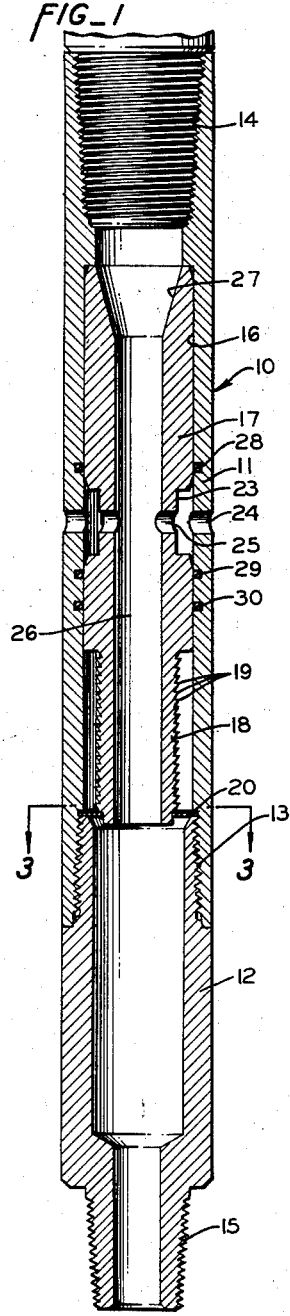
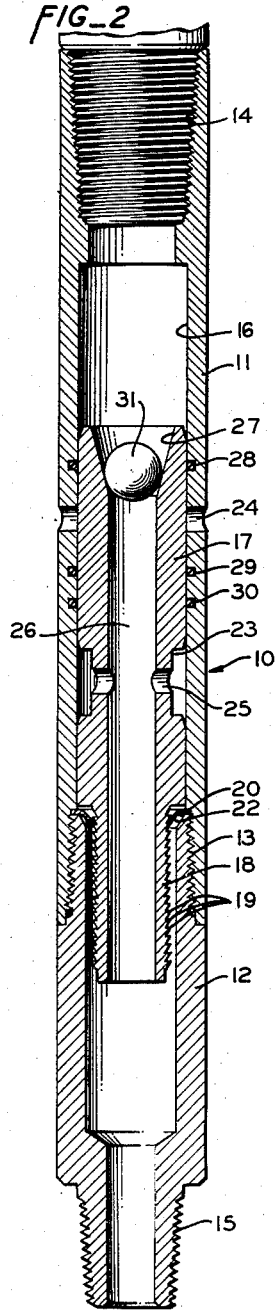
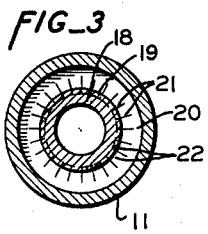
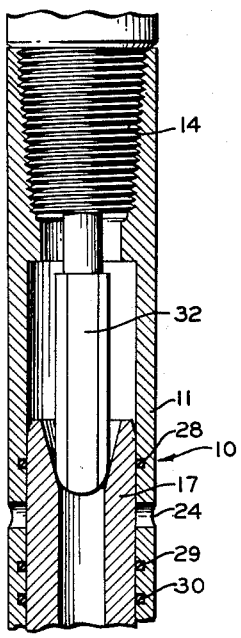
INVENTOR.
THOMAS A. SACKETT
PARKER F. GLASS
*Mellin and Hanson*
ATTORNEYS

United States Patent Office 2,947,363
Patented Aug. 2, 1960

2,947,363

FILL-UP VALVE FOR WELL STRINGS

Thomas H. Sackett and Parker F. Glass, Avenal, Calif., assignors, by mesne assignments, to Johnston Testers, Inc., Houston, Tex., a corporation of Texas Filed Nov. 21, 1955, Ser. No. 548,061

5 Claims. (Cl. 166—224)

This apparatus relates to a fill up valve for use with tubing strings in deep wells. It is well known that tubing cannot be run dry into wells of greater depth than 6,000 or 8,000 feet without having the tubing collapse due to the hydrostatic head surrounding the pipe. It is, therefore, necessary in wells of greater than this depth to fill the lower portion of the tubing with oil or drilling mud. The filling of several thousand feet of pipe with oil or mud and allowing time for the air to escape normally takes several hours.

It is, therefore, the principal object of this invention to provide a device for permitting the pipe to fill as it is being lowered in the well.

A further object of this invention is to provide a valve adapted to be inserted in a tubing string adjacent the lower end thereof which permits the tubing to fill as it is lowered, and wherein the valve may be closed after a predetermined amount of fluid has been admitted.

A preferred embodiment of the invention is described in the following detailed specification, and illustrated by way of example in the accompanying drawings, wherein:

Fig. 1 is a sectional view of a valve embodying the principles of the invention and showing the valve in its open or fluid admitting position.

Fig. 2 is a similar view to that shown in Fig. 1 and shows the valve in its closed position.

Fig. 3 is a sectional view taken on line 3—3 of Fig. 1.

Fig. 4 is a fragmentary sectional view similar to that shown in Fig. 2 and illustrates a modified form of go-devil.

Referring now to the drawings, wherein similar reference numerals are used to denote the same elements throughout the various views shown, 10 generally indicates the body or housing of the valve assembly, the housing comprising upper and lower sections 11 and 12, respectively, threaded together as indicated at 13. The upper end of the upper housing section 11 is provided with a threaded box 14, and the lower end of the housing section 12 is provided with a threaded pin 15 to permit the insertion of the housing into a tubing string.

The upper housing section 11 is counterbored, as indicated at 16, to slidably receive a sleeve valve 17. The valve 17 is provided at its lower end with a portion 18 of reduced external diameter. Said reduced diameter portion 18 is provided on its outer surface with a plurality of upwardly facing buttress type teeth 19. An annular latch plate 20 is confined between the two sections 11 and 12 of the housing 10, and is provided with a plurality of radially extending slits 21 extending outwardly from its inner edge to form a plurality of inwardly extending fingers 22.

The valve 17 is provided intermediate its ends with an annular groove 23 adapted to be in register with a plurality of radial ports 24 extending through the upper housing section 11 when the valve 17 is in its uppermost position relative to the housing 10. A plurality of radial ports 25 connect the groove 23 with a longitudinal passage 26 extending through the valve body. The upper end of the passage 26 is tapered outwardly in the manner illustrated at 27.

An O-ring 28 is mounted in a suitable groove in the interior of the upper housing section 11 above the ports 24, and bears against the exterior of the valve 17 in sealing engagement therewith. Similarly, a pair of O-rings 29 and 30 is mounted in suitable grooves in the upper housing section 11 below the ports 24, and are in sealing engagement with the valve 17.

In the use of the device, the elements are assembled in the manner illustrated in Fig. 1, and the string is lowered in the well until the desired amount is filled with fluid entering through the ports 24 and 25. When the desired amount of fluid has entered the string, a ball 31 is dropped into the string to seat in the tapered portion 27 of the passage 26, and pump pressure is applied to move the valve 17 downwardly relative to the housing 10. When the valve 17 moves downwardly, the teeth 19 on the lower portion 18 thereof bend the fingers 22 downwardly, and the fingers interlock with the teeth 19 to prevent upward movement of the valve 17 in the manner indicated in Fig. 2.

In the modification shown in Fig. 4, a go-devil 32 is used to force the valve 17 down by impact.

When the test tool below the valve is opened to admit test fluid, the fluid passes upwardly through the passage 26 and either raises the ball 31 or flows around the go-devil 32.

While we have shown and described the preferred form of our invention, it is obvious that various changes may be made in its construction by those skilled in the art, without departing from the spirit of the invention as defined in the appended claims.

Having thus described our invention, what we claim and desire to secure by Letters Patent is:

1. A fill-up valve assembly for use with well strings comprising a tubular housing adapted to be inserted in a well string, a sleeve valve slidably mounted within said housing for limited longitudinal movement relative thereto, radial ports in said housing, radial ports in said sleeve valve in fluid communication with the radial ports in said housing when said sleeve valve is in its uppermost position relative to said housing, inwardly extending resilient latch fingers connected to said housing and normally retaining said sleeve valve in its uppermost position relative to said housing, and a member sized to drop through a well string to seat in and close the upper end of said sleeve valve for moving said sleeve valve downwardly relative to said housing to move said radial ports out of fluid communication.

2. A fill-up valve assembly for use with well strings comprising a tubular housing adapted to be inserted in a well string, a sleeve valve slidably mounted within said housing, radial ports in said housing, radial ports in said sleeve valve in fluid communication with the radial ports in said housing when said sleeve valve is in its uppermost position relative to said housing, deformable latch fingers connected to said housing and normally retaining said sleeve valve in its uppermost position relative to said housing, means on said sleeve valve adapted to bend said latch fingers downwardly when said sleeve valve is moved downwardly relative thereto and to be engaged by said downwardly bent fingers to prevent upward movement of said sleeve valve relative to said housing, and a member sized to drop through a well string to seat in and close the upper end of said sleeve valve for moving said sleeve valve downwardly relative to said housing to move said radial ports out of fluid communication.

3. A fill-up valve assembly for use with well strings comprising a tubular housing adapted to be inserted in a well string, a sleeve valve slidably mounted within said housing, radial ports in said housing, radial ports in said sleeve valve in register with the radial ports in said housing when said sleeve valve is in its uppermost position relative to said housing, deformable latch fingers connected to said housing and normally retaining said sleeve valve in its uppermost position relative to said housing, a plurality of upwardly pitched buttress teeth on said sleeve valve adapted to bend said latch fingers downwardly when said sleeve valve is moved downwardly relative thereto and to be engaged by said downwardly bent fingers to prevent upward movement of said sleeve valve relative to said housing, and a member sized to drop through a well string to seat in and close the upper end of said sleeve valve for moving said sleeve valve downwardly relative to said housing to move said radial ports out of fluid communication.

4. A fill-up valve assembly for connection adjacent the lower end of a well string above a normally closed test tool comprising a tubular housing having threaded ends for endwise connection in said well string and having an enlarged bore intermediate said ends, a sleeve valve having an unobstructed bore therethrough slidably received in said enlarged housing bore for movement between upper and lower positions, said housing and said sleeve valve having radial ports which place the bore of said well string in fluid communication with the exterior thereof via the bore of said sleeve valve when said sleeve valve is in its upper position, annular seal means for sealing between said housing bore and the outer periphery of said sleeve valve in the lower position of said sleeve valve to close off fluid communication through said ports, removable means at least partially closing the upper end of the sleeve valve bore for transmitting a downward force to said sleeve valve, and means for retaining said sleeve valve in its upper open position until a desired amount of fluid has been received through said ports into the bore of said well string and responsive to said downward force to release said sleeve valve for movement to its lower closed position.

5. A fill-up valve assembly as defined in claim 4 wherein said removable means seats in and closes the upper end of said sleeve valve bore for application of hydrostatic force to said sleeve valve, said removable means being adapted for rising in said well string with fluid admitted through said test tool when said test tool is opened.

References Cited in the file of this patent
UNITED STATES PATENTS

| | | |
|---|---|---|
| 1,849,604 | Weatherhead | Mar. 15, 1932 |
| 2,129,216 | Johnston | Sept. 6, 1938 |
| 2,263,412 | Armentrout | Nov. 18, 1941 |
| 2,602,510 | Baker | July 8, 1952 |
| 2,690,895 | Barcus | Oct. 5, 1954 |
| 2,698,054 | Brown et al. | Dec. 28, 1954 |
| 2,741,314 | Deters | Apr. 10, 1956 |
| 2,847,074 | Maly et al. | Aug. 12, 1958 |